United States Patent [19]

Lii

[11] Patent Number: 5,054,533
[45] Date of Patent: Oct. 8, 1991

[54] WIND-SHIELD BLIND SYSTEM

[76] Inventor: Jong-Yih Lii, No. 17, Alley 160, Lane 164, Jong-Shan N. Road, Yung-Kang Hsiang, Tainan Hsien, Taiwan

[21] Appl. No.: 637,535

[22] Filed: Jan. 4, 1991

[51] Int. Cl.⁵ .............................................. E06B 9/56
[52] U.S. Cl. ................................... 160/302; 160/23.1; 160/305; 160/370.2
[58] Field of Search .................... 160/23.1, 294, 301, 160/302, 305, 313, 323.1, 370.2, 304.1; 296/37.16, 95.1, 97.7, 97.8

[56] References Cited

U.S. PATENT DOCUMENTS

| | | | |
|---|---|---|---|
| 1,621,972 | 3/1927 | Darby | 160/23.1 |
| 2,561,188 | 7/1951 | Ferguson | 160/23.1 |
| 2,589,609 | 3/1952 | Foster | 160/23.1 |
| 4,335,773 | 6/1982 | Masi | 160/23.1 |
| 4,707,018 | 11/1987 | Gavagan | 160/23.1 X |
| 4,762,358 | 8/1988 | Levosky et al. | 160/323.1 X |
| 4,823,859 | 4/1989 | Park | 160/23.1 X |
| 4,869,542 | 9/1989 | Lin | 160/370.2 X |

*Primary Examiner*—David M. Purol
*Attorney, Agent, or Firm*—Bacon & Thomas

[57] ABSTRACT

A wind-shield blind system for insulating heat transfer into a car comprises a roller blind carried by a roller blind mechanism having a ratcheting mechanism which allows the roller blind to extend only and prevents it from being accidentally rewound so as to lock the roller blind stationary with respect to the roller at any of a plurality of positions along its extension. The roller blind mechanism can be released from the effect of the ratcheting mechanism by pressing a control stem to automatically rewind the roller blind.

2 Claims, 5 Drawing Sheets

WIND-SHIELD BLIND SYSTEM

BACKGROUND OF THE INVENTION

The present invention relates to a wind-shield blind system.

Conventionally, a wind-shield blind system for insulating the heat transfer into a car through its front or rear wind-shield, the system of which comprises a roller blind mechanism 1 adapted to be detachably mounted on one side of a wind-shield pane for extending a blind thereof transversely across the inner side of the wind-shield. As shown in FIGS. 1 and 2, the roller blind mechanism 1 includes a tube 10 which provides a spindle for carrying an opaque plastic film 102 and is formed with slits 100, 101 in its opposite ends. Each end of the tube 10 receives a solid nylon plug 11 or 12 which is prevented from rotating relative to the tube 10 by forming a projection 113 or 123 correspondingly received in the slit 100 or 101. The first plug 11 has a central longitudinal bore 115. Extending through the plug bore 115 is a rod 13, one end of which is formed with a notch or split 131 and the other end of which, lying outwardly of the first plug 11, is formed with a flattened section 130. A helical torsion spring 14 is disposed around the rod 13, one end 141 being fixed to the notched end 131 and the other end 140 being fixed to the first plug 11. The first plug 11 is further rotatably mounted in a first end cap member 15 which has a central cylindrical spigot 152 lying on the axis of the plug bore 115 of the first plug 11. The flattened end 130 of the rod 13 is protruded from the first plug 11 and is non-rotatably received in a corresponding aperture 153 in the spigot 152 of the first cap member 15. Thus, when the first end cap member 11 is driven to rotate about the rod 13, the coil spring 14 is progressively stressed so that when the tube 10 is then released, the spring acts to rotate the tube 10 back to its original position.

The second plug 12 is rotatably mounted in a second end cap member 16 which has a central conical spigot 162 lying on the axis of the plug bore 122 of the second plug 12 and adapted to be slightly loosely inserted into the bore 122. A curved cap member 17 is mounted on this blind system with two opposite ends 170, 171 formed with screw holes 172, 173 and respectively inserted into recesses 151, 161 of the first and second end cap members 15, 16. Said curved cap member 17 is fixed in position by means of screws N3, N4 tightly threading into corresponding screw holes 150, 172 and 160, 173.

The known roller mechanism 1 is mounted in position on two spaced suction cups (not shown) by means of two bracket assemblies 18, 19 secured to opposite end portions of the curved cap member 17 by means of screws N1, N2 tightly threading into corresponding screw holes 180, 174 and 190, 175. The blind 102 of the known roller blind mechanism 1 should be fully extended across the wind-shield so that a loop member 100 attached to the leading edge of the blind can be brought to a hook member (not shown) for an interengagement therebetween. It is found that the loop member and the hook member of this known wind-shield blind system may accidentally be disconnected and the blind is automatically rewound onto the spindle during driving as the system is used on rear wind-shield.

SUMMARY OF THE INVENTION

It is a primary object of the present invention to provide a wind-shield blind system which has a ratchet for locking a roller carrying a blind to lock the blind stationary with respect to the roller at any of a plurality of positions along the extension of the blind.

With the above objective in view, a wind-shield blind system for insulating heat transfer into a car according to the present invention which comprises a roller blind carried by a roller blind mechanism having a ratcheting mechanism which allows the roller blind to extend only and prevents it from being accidentally rewound so as to lock the roller blind stationary with respect to the roller at any of a plurality of positions along its extension. The roller blind mechanism can be released from the effect of the ratcheting mechanism by pressing a control stem to automatically rewind the roller blind.

DETAILED DESCRIPTION OF THE PREFERRED EMBODIMENT

Figure 1:
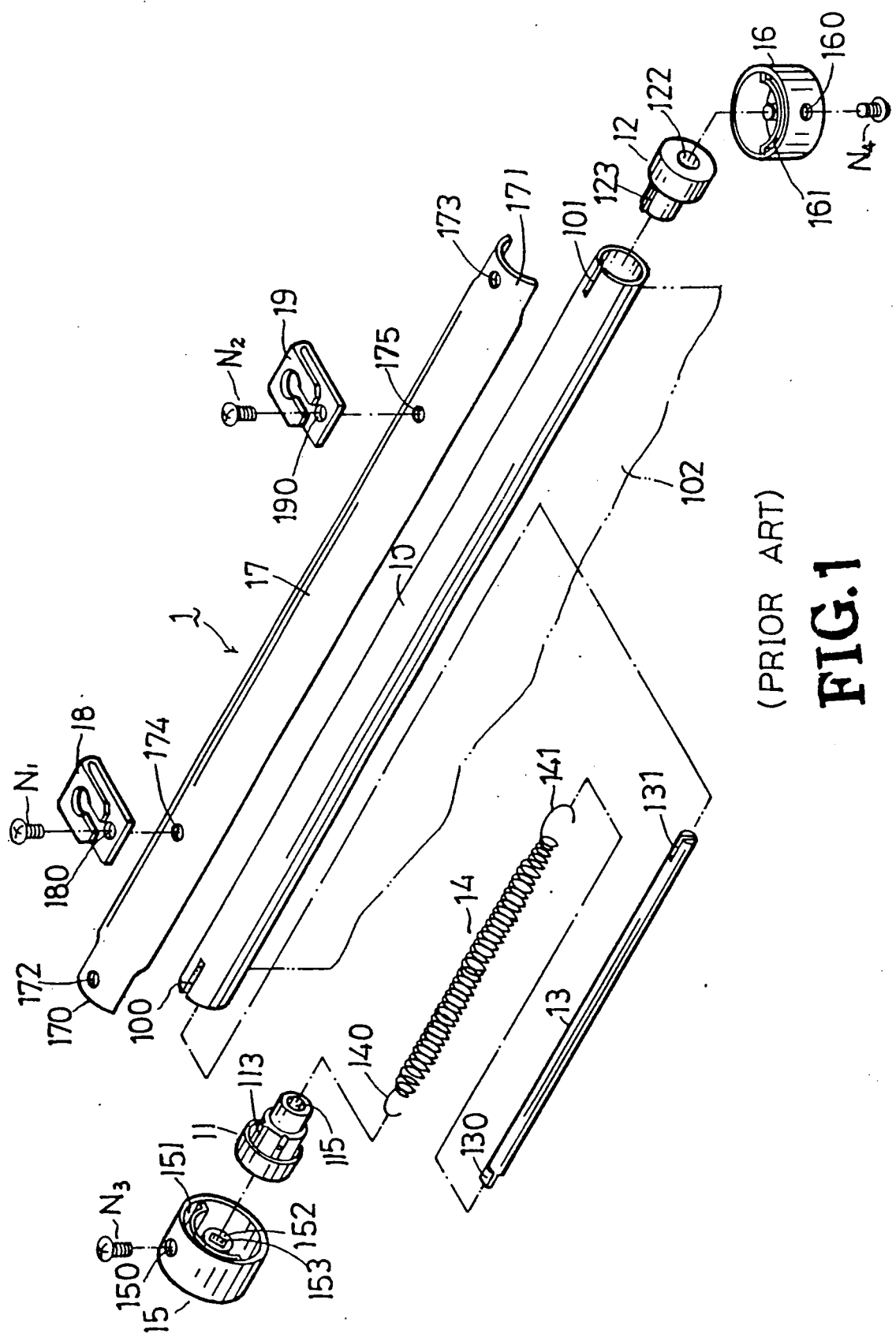
FIG. 1 is an exploded perspective view of a known wind-shield blind system.
Figure 2:
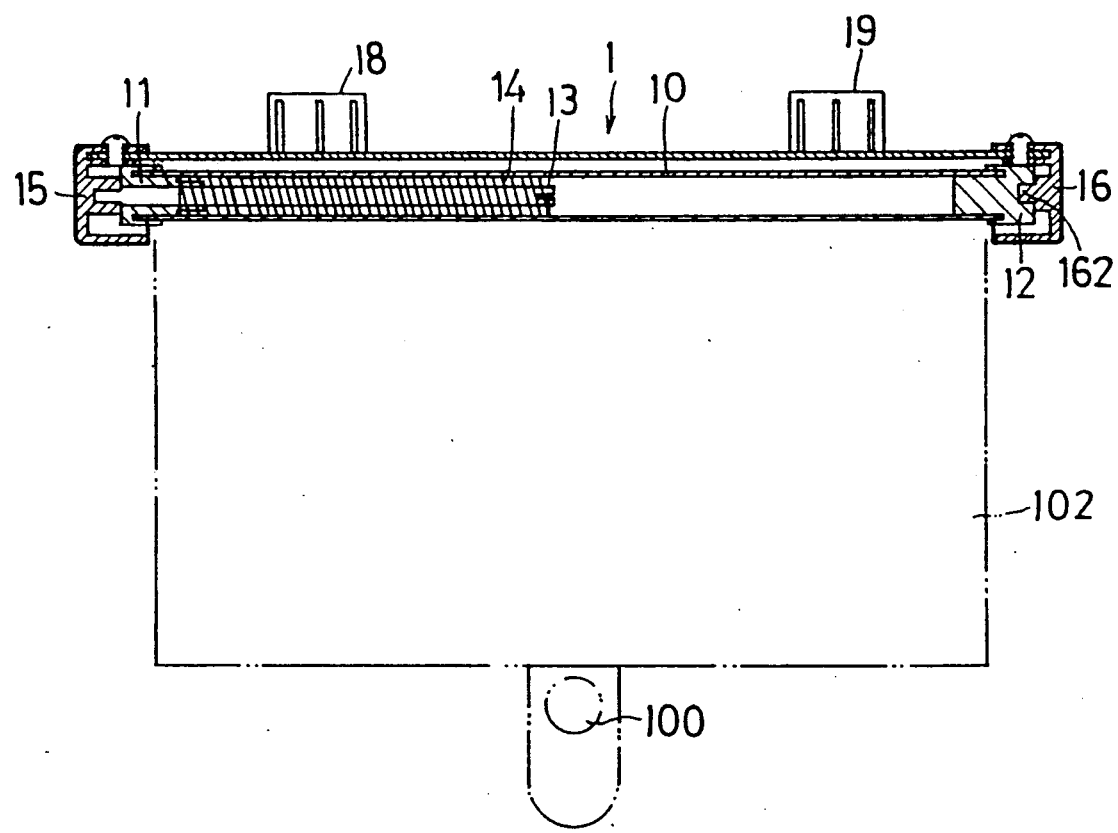
FIG. 2 is a cross-sectional view of the known wind-shield blind system which is in assembled state.
Figure 3:
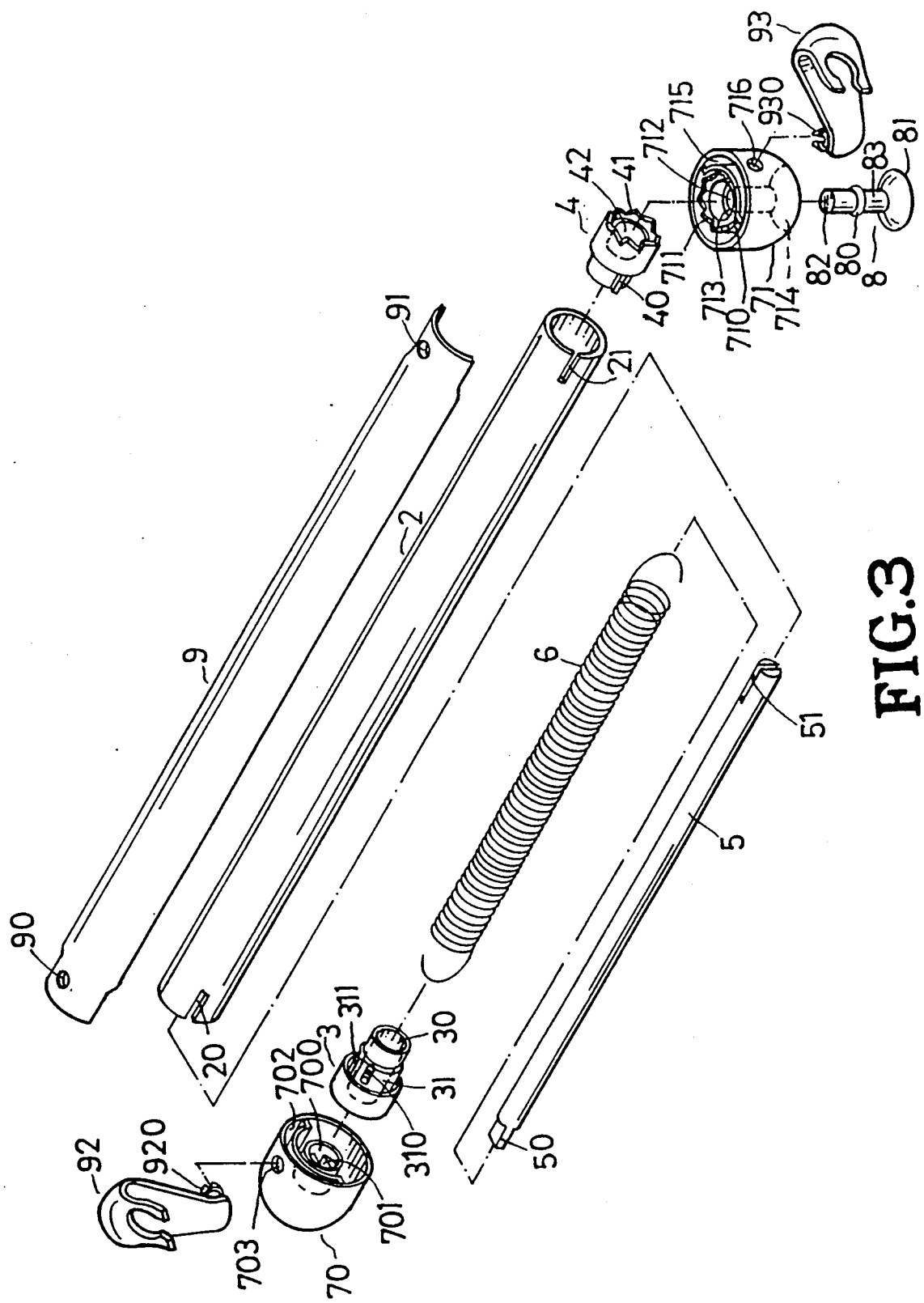
FIG. 3 is an exploded perspective view of a preferred embodiment of a wind-shield blind system according to the present invention.
Figure 6:
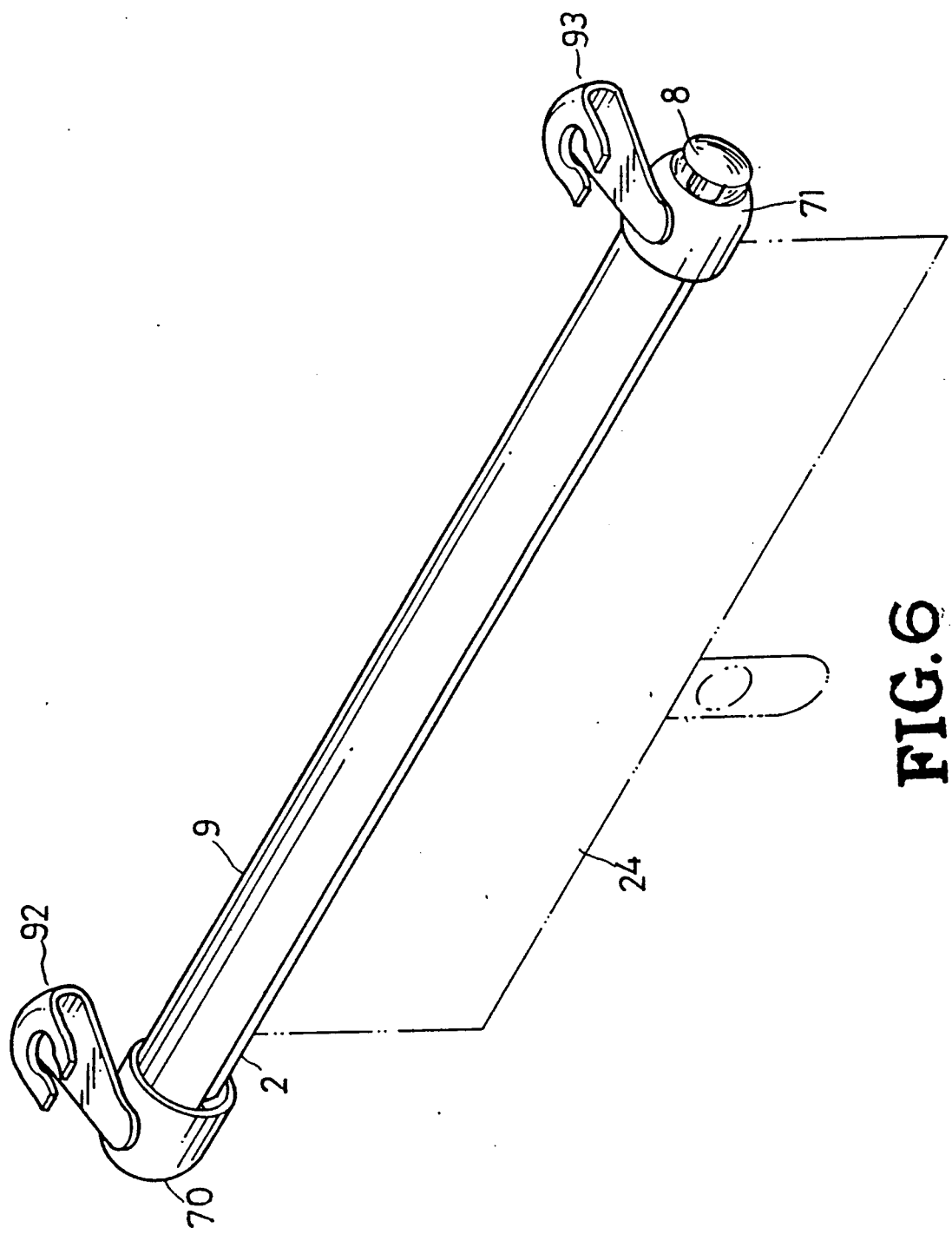
FIG. 6 is a perspective view of the preferred embodiment which is in assembled state.

Referring to FIGS. 3 and 6, a wind-shield blind system according to the present invention which comprises a roller having a tube 2 providing a spindle for carrying an opaque plastic film 24 and being formed with splits 20, 21 in its opposite ends, and two solid plugs 3,4 which are plugged in the opposite ends of the tube 2 and prevented from rotating relative to the tube 2 by forming ribs 311, 40 respectively engaged in the splits 20, 21 thereof. The first plug 3 has a central longitudinal bore 30. Extending through the plug bore 30 is a rod 5, one end of which is formed with a notch or split 51 and the other end of which, lying outwardly of the first plug 3, is formed with a flattened section 50.

A helical torsion spring 6 is disposed around the rod 5, one end being fixed to the split end 51 of the rod 5 and the other end being fixed in a hole 310 of the first plug 3. The first plug 3 is slightly loosely received by a first end cap member 70 which has a central cylindrical spigot 700 lying on the axis of the plug bore 30 of the first plug 3. The flattened end 50 of the rod 5 is protruded from the first plug 3 and is non-rotatably received in a corresponding aperture 701 formed in the spigot 700 of the first cap member 70. Thus, when the first end cap member 70 is driven to rotate about the rod 5, the coil spring 6 is progressively stressed so that when the tube 2 is then released, the spring 6 acts to rotate the tube 2 back to its original position.

A ratchet device opposed to the first plug 3 and end cap member 70 is secured to the other end of the tube 2. Said ratchet device includes the second plug 4, second end cap member 71 and a control stem 8. Said control stem 8 includes a shank 83, which is provided with a circumferential ridge 80 at the middle portion thereof, and an end enlargement of flange 81 having a convex inner side wall. Said second end cap member 71 is formed with a concave recess 714 for compensatorily receiving the end enlargement 81 of the control stem 8 and a central passage 712 extending therethrough for slidably receiving the shank 83 of the control stem 8. A face 713 is formed in the central passage 712 for overlying the ridge 80 and engaging the same to restrict the control stem 8 from being released from the second end cap member 71. Said second plug 4 is formed with a central recess 42 which is so dimensioned to loosely receive leading end of the shank 83 of the control stem 8. An inner cylindrical wall 710, which is formed with a toothed rim 711, is coaxially formed in the second end cap member 71. Said second plug 4 is formed with a toothed rim 41 adjacent to and meshable with the toothed rim 711 of the second end cap member 71. The shank 83 of the control stem 8 extends through the central passage 712 of the second end cap member 71 with the circumferential ridge 80 positioned inwardly beyond the face 713 and the leading end 82 of the shank 83 further into the recess 42 of the second plug 4.

A curved cap member 9 is mounted on this preferred embodiment with two opposite ends formed with holes 90, 91 and respectively inserted into corresponding recesses 702, 715 defined in the first and second end cap members 70, 71. Two modified bracket assemblies 92, 93 are provided in the present invention for fixing the two end portions of the curved cap member 9 in the recesses 702, 715 of the end cap members 70, 71 and, for mounting this roller mechanism in position on two spaced suction caps (not shown). Lower end of the bracket assemblies 92, 93 are respectively provided with posts. Each post has a tapered enlargement 920 or 930 at the free end thereof which is split longitudinally through its center. The enlargements 92, 93 are yieldable whereby they can be squeezed together when inserted through the corresponding holes 90, 703 and 91, 716 and after passing therethrough can expand to provide the interlock between the curved cap member 9 and the end cap members 70 or 71.

Figure 4:
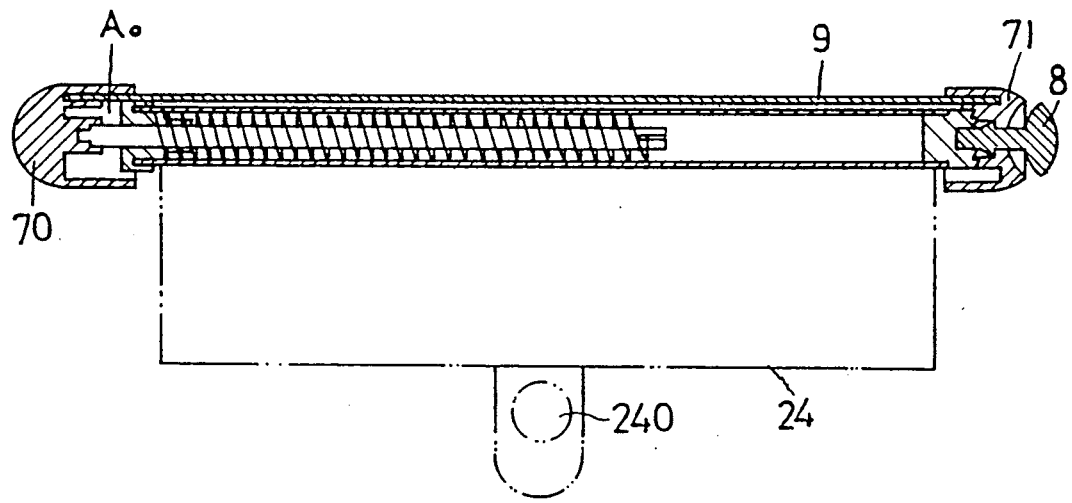
FIG. 4 is a cross-sectional view of the preferred embodiment which is in ratchet-effective state.
Figure 5:
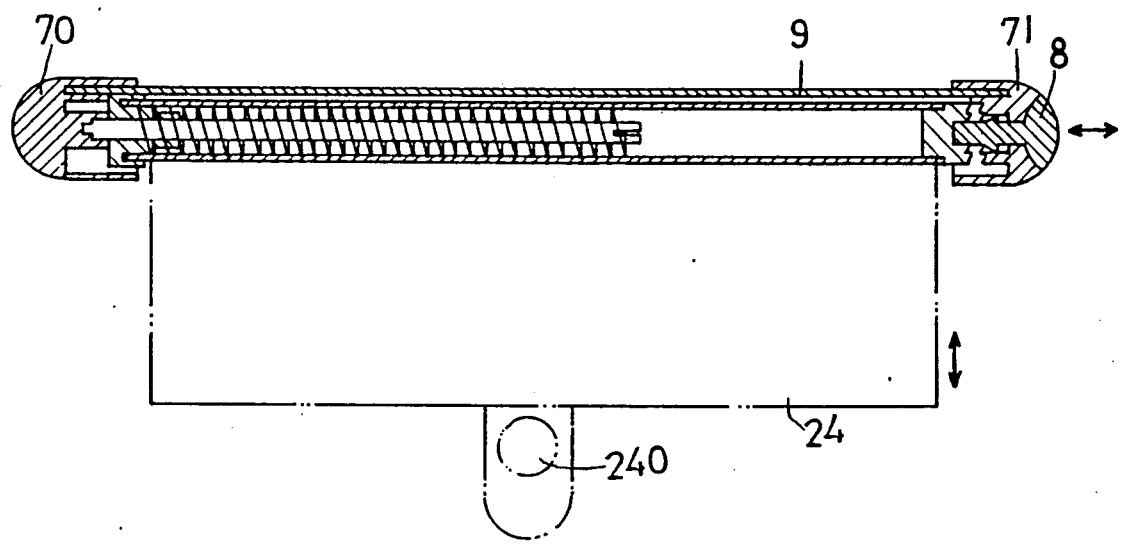
FIG. 5 is a cross-sectional view of the preferred embodiment which is in ratchet-free state.

In operation, the ratchet device allows the blind 24 to extend only and prevents it from being rewound so as to lock the blind stationary with respect to the roller at any of a plurality of positions along its extension, as best shown in FIG. 4. The loop member 240 attached to the leading edge of the blind 24 can be brought to a hook member (not shown), which can be selectively position on the inner side of the wind-shield pane through a suction cup (not shown) apart from the roller, for an interengagement therebetween without any rewinding force exerting on the blind 24. Therefore, risks of disconnection between the loop member 240 and the hook member can be dramatically reduced. As the fixture of the curved cap member 9 to the end cap members 70, 71 allows a gap Ao between the roller and end cap members 70, 71 for a reciprocal shiftment of the roller along its axial direction, the roller can be released from the ratcheting effect by pressing the enlarged end 81 of the stem 8 to re-locate the roller from its engaging position, as shown in FIG. 4, into its disengaging position, as shown in FIG. 5, whereby the roller can rotate either directions allowing the blind 24 to extend or be automatically rewound onto the spindle provided by the tube 2.

What is claimed is:

1. A wind-shield blind system for thermally insulating a car wind-shield comprising:

a roller blind mechanism having an elongated tubular member carrying an opaque plastic blind and end plugs non-rotatably attached to opposite ends of the tubular member, wherein a first end plug of said end plugs is formed with a central passage extending axially therethrough and a second end plug is formed with a toothed rim at outer side thereof and an axial cylindrical recess extending outwardly;

a rod member adapted to extend through the central passage of the first plug, which is rotatable about the rod member, and having a first end and a second end;

a helical spring disposed around the rod member;

means for fixing one end of the helical spring to the first end of the rod member and the other end of the helical spring to the first end plug;

means for interconnecting two end cap members which are arranged in spaced-apart relation, wherein a first end cap member is axially provided with an aperture means for non-rotatably receiving the second end of the rod member and a second end cap member formed with a central passage extending axially therethrough and a toothed rim at an inner side thereof adjacent to and meshable with the toothed rim of the second plug to serve as a catch to the toothed rim of the second plug for preventing the tubular member from rewinding after having been driven to extend the blind thereon; and a control means having an axle extending through the central passage of the second plug and into the cylindrical recess of the second plug, which is rotatable about the axle, and enabling the roller blind mechanism to be displaced on said rod member between a first position, wherein the adjacent toothed rims of the second plug and the second end cap member are in spaced-apart relation, and a second position, wherein the adjacent toothed rims are in interengaged state.

2. A wind-shield blind system as claimed in claim 1 wherein two bracket assemblies are further provided for mounting the roller blind mechanism on a car windshield pane, said bracket assemblies have fasteners each of which includes a post and a tapered enlargement at the free end thereof for forcefully extending through corresponding holes in the end cap members and their connecting means to provide an interlock therebetween.

* * * * *